(12) United States Patent
Uhlig et al.

(10) Patent No.: US 11,947,511 B2
(45) Date of Patent: Apr. 2, 2024

(54) INDEXING A DATA CORPUS TO A SET OF MULTIDIMENSIONAL POINTS

(71) Applicant: GHOST AUTONOMY INC., Mountain View, CA (US)

(72) Inventors: Volkmar Uhlig, Cupertino, CA (US); John Hayes, Mountain View, CA (US); Akash J. Sagar, Redwood City, CA (US); Faissal Sleiman, Austin, TX (US); David Stephenson, San Mateo, CA (US); Daniel J. Fillingham, Sunnyvale, CA (US); Timothy Cerexhe, Mountain View, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 35 days.

(21) Appl. No.: 17/740,888

(22) Filed: May 10, 2022

(65) Prior Publication Data
US 2023/0367755 A1    Nov. 16, 2023

(51) Int. Cl.
*G06F 18/22* (2023.01)
*G06F 16/22* (2019.01)
*G06K 9/62* (2022.01)

(52) U.S. Cl.
CPC ...... *G06F 16/2264* (2019.01); *G06F 16/2272* (2019.01); *G06F 18/22* (2023.01)

(58) Field of Classification Search
CPC ... G06F 16/2264; G06F 16/2272; G06F 18/22
See application file for complete search history.

(56) References Cited

U.S. PATENT DOCUMENTS

| | | | |
|---|---|---|---|
| 11,010,691 B1* | 5/2021 | Chen | G06N 20/00 |
| 11,501,042 B2* | 11/2022 | Steingrimsson | G06N 3/04 |
| 11,754,998 B2 | 9/2023 | Zhao et al. | |
| 2015/0338550 A1* | 11/2015 | Wadsley | G06F 17/10 703/2 |
| 2021/0018590 A1 | 1/2021 | Grau | |
| 2021/0117696 A1 | 4/2021 | Hertlein et al. | |
| 2022/0230072 A1 | 7/2022 | Gladisch et al. | |
| 2022/0246241 A1* | 8/2022 | Acedo | A01C 21/002 |
| 2022/0284294 A1 | 9/2022 | Keller et al. | |
| 2022/0391766 A1 | 12/2022 | Marrero et al. | |
| 2023/0092969 A1* | 3/2023 | Chang | G06F 18/2137 706/15 |
| 2023/0105871 A1 | 4/2023 | Nichols | |

OTHER PUBLICATIONS

Cheng et al., "Computational Investigation of Low-Discrepancy Sequences in Simulation Algorithms for Bayesian Network", Uncertainty in Artificial Intelligence Proceedings, 2000, pp. 72-81.

\* cited by examiner

*Primary Examiner* — Hosain T Alam
*Assistant Examiner* — Chongsuh Park

(57) ABSTRACT

Indexing a data corpus to a set of multidimensional points, including: generating a set of points in a multidimensional space; identifying, for each sample in a plurality of samples in a data corpus, a nearest point in the set of points; and generating an index mapping each sample with the nearest point in the set of points.

20 Claims, 9 Drawing Sheets

| Index 108 | |
|---|---|
| Sample ID 202a | Point ID 204a |
| Sample ID 202b | Point ID 204b |
| ... | |
| Sample ID 202n | Point ID 204n |

FIG. 2

INDEXING A DATA CORPUS TO A SET OF MULTIDIMENSIONAL POINTS

BACKGROUND

Some operations, such as training of a machine learning model, benefit from having an evenly distributed set of training data. Where a data corpus from which training data is selected is itself not evenly distributed, it may be difficult to select an evenly distributed set of training data. For example, where a data corpus contains tightly grouped clusters of data, or where certain scenarios or values or more frequently represented in the training data, a randomly selected set of training data will tend to reflect these groupings or frequencies

BRIEF DESCRIPTION OF THE DRAWINGS

FIG. 2 is an example index for indexing a data corpus to a set of multidimensional points according to some embodiments of the present disclosure.

DETAILED DESCRIPTION

Some operations, such as training of a machine learning model, benefit from having an evenly distributed set of training data. Where a data corpus from which training data is selected is itself not evenly distributed, it may be difficult to select an evenly distributed set of training data. For example, where a data corpus contains tightly grouped clusters of data, or where certain scenarios or values or more frequently represented in the training data, a randomly selected set of training data will tend to reflect these groupings or frequencies.

Figure 1:
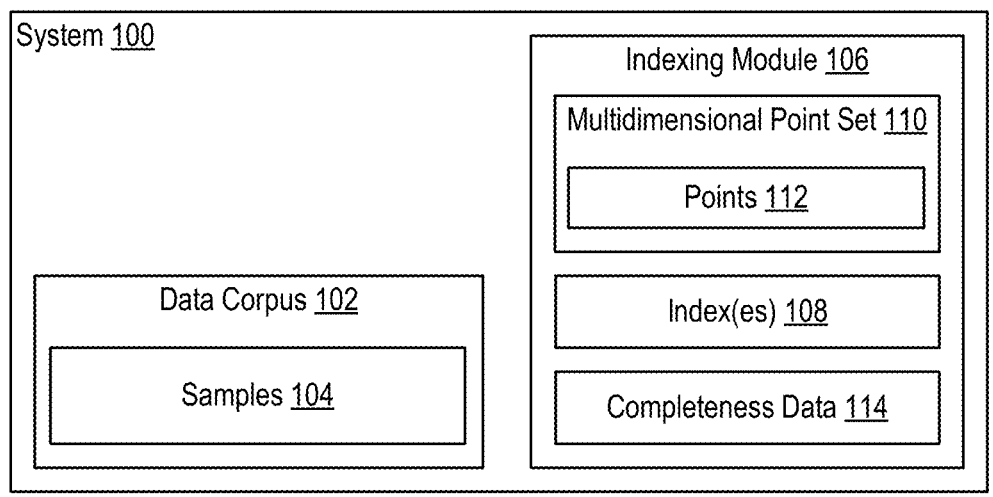
FIG. 1 is a block diagram of an example system for indexing a data corpus to a set of multidimensional points according to some embodiments of the present disclosure.

To address these concerns, FIG. 1 sets forth a block diagram of an example system 100 for indexing a data corpus to a set of multidimensional points according to some embodiments of the present disclosure. The system 100 may be implemented by a variety of computing devices, execution environments, and the like as are set forth in further detail below. The system 100 includes a data corpus 102. The data corpus 102 is a collection of multiple records each having multiple fields of values. Such records are shown as samples 104. As each sample 104 includes multiple fields, each field may be considered a dimension of a sample 104 such that each sample 104 may be expressed as a multidimensional value or data structure. In some embodiments, the data corpus 102 is implemented as a database, a table, a multidimensional array, or other data structure as can be appreciated.

The system 100 also includes an indexing module 106, an application or service for indexing a data corpus to a set of multidimensional points according to some embodiments of the present disclosure. The indexing module 106 serves to map the samples 104 in the data corpus 102 to points in a multidimensional space and generate one or more indexes 108 describing these mappings. To that end, the indexing module 106 generates a multidimensional point set 110. The multidimensional point set 110 includes multiple points 112 of a particular dimensionality. In some embodiments, the dimensionality of the multidimensional point set 110 corresponds to the dimensionality of the samples 104 in the data corpus 102. For example, where each sample 104 includes N fields, the multidimensional point set 110 includes points of N dimensions.

In some embodiments, the dimensionality of the multidimensional point set 110 is of fewer dimensions than the dimensionality of the samples 104 in the data corpus 102. For example, in embodiments where the samples 104 include one or more categorical fields, the dimensionality of the multidimensional point set 110 is equal to the number of non-categorical fields in the samples 104. As described herein, a categorical field is a field whose value is selected from multiple predefined labels or categories (e.g., shirt sizes, a predefined selection of colors, and the like), in contrast to a field whose value is a continuous or other numerical value. In other words, the dimensionality of the multidimensional point set 110 is equal to the dimensionality of the samples 104 minus a number of categorical fields in the samples 104.

The multidimensional point set 110 may be generated according to a variety of algorithms or functions as can be appreciated. For example, in some embodiments, the multidimensional point set 110 may be generated by a manual entry or configuration. As another example, in some embodiments, the multidimensional point set 110 may be generated by iteratively increasing or decreasing particular values in the multidimensional point set 110 to create points 112 each having a particular distance from a previously calculated point 112. In some embodiments, the multidimensional point set 110 may be generated by calculating a sequence of points in multidimensional space. For example, the multidimensional point set 110 may be generated according to a low-discrepancy sequence or a quasi-random low-discrepancy sequence such as a Sobol sequence. In order for the multidimensional point set 110 to provide for an evenly distributed indexing of the data corpus 102, the multidimensional point set 110 should be generated according to some degree of evenness, uniformity, or distribution.

In some embodiments, the number of points 112 in the multidimensional point set 110 is a predefined or default number. In some embodiments, the number of points 112 in the multidimensional point set 110 is based on a user-provided value. In some embodiments, the number of points 112 in the multidimensional point set 110 may correspond to a number of samples 104 to be included in a sample set taken from the data corpus 102. For example, assume that a training data set is to be selected from the data corpus 102 having N samples, the multidimensional point set 110 may be selected as having N points. Accordingly, in some embodiments, the multidimensional point set 110 and the indexes 108 described below may be generated in response to a request or as part of a process for selecting a set of samples 104 from the data corpus 102. One skilled in the art will appreciate that the number of points 112 in the multidimensional point set 110 may vary according to particular design and performance considerations.

The indexing module 106 then maps one or more of the samples 104 in the data corpus to the multidimensional point set 110. In some embodiments, the samples 104 to be mapped may include the entire data corpus 102, or a subset of samples 104 selected or defined to some criteria or query as can be appreciated. A sample 104 is mapped to a point 112 in the multidimensional point set 110 by determining which point 112 is nearest to the sample 104 based on some distance function, such as Euclidean distance. Thus, for each sample 104 to be mapped, a nearest point 112 in the multidimensional point set 110 is identified.

In some embodiments, one or more values in the samples 104 may be normalized or scaled according to the particular multidimensional point set 110 being used. For example, where the multidimensional point set 110 is generated based on a Sobol sequence, with each value in any dimension being between 0.0 and 1.0, one or more values of the samples 104 may be scaled or normalized to the 0.0 to 1.0 range. After identifying the nearest point 112 for each sample 104 to be mapped, an index 108 is generated that associates each sample 104 with its identified nearest point 112. For example, turning to FIG. 2, an index 108 may include a table or other data structure with each entry including a sample identifier 202a,b-n and a correspond point identifier 204a,b-n. In some embodiments, the index 108 may store one or more entries for points 112 to which no sample 104 is mapped. Accordingly, such entries may include null or zero values for the sample identifier 202a, b-n.

As was set forth above, in some embodiments, the samples 104 may include one or more categorical fields. Accordingly, in such embodiments, the indexing module 106 may generate an index 108 for each possible permutation of values for the categorical fields. For example, where the samples 104 include a single categorical field of three possible values, the indexing module 106 may generate three indexes 108. As another example, where the samples 104 include two categorical fields each of two possible values, the indexing module 106 may generate four indexes 108. To do so, the indexing module 106 selects, for a given permutation of categorical values, those samples 104 having those categorical values. The nearest point 112 in the multidimensional point set 110 is then identified for the selected samples and an index 108 corresponding to that permutation of categorical values is selected.

In some embodiments, where the samples 104 include one or more categorical fields, values for the categorical fields may be converted to numerical or continuous values. In such embodiments, fewer indexes 108 (e.g., a single index 108) may be used as no permutation for a categorical field whose values are converted into a continuous value is needed. For example, where values for all categorical fields are converted into continuous values, a single index may be used 108.

In some embodiments, as samples 104 are added to the data corpus 102, a nearest point 112 in the multidimensional point set 110 may be identified in response to the addition of the sample 104. An index 108 may then be updated to include an entry associating the newly added sample 104 with its identified nearest point.

In some embodiments, a request for a number of samples 104 from the data corpus 102 may be received. For example, assume that a request for N samples 104 from the data corpus 102 is received in order to generate a set of training data having N samples 104. In response, a number of points 112 is selected from the multidimensional point set 110 (e.g., N points 112). In some embodiments, the number of points 112 may be selected as a range or sequence of points. For example, where the multidimensional point set 110 is generated according to a Sobol sequence, the points 112 may be selected as the first N points 112 in the Sobol sequence. A particular advantage of the Sobol sequence is that, as points 112 are added to the sequence, each point 112 is added to fill gaps in the multidimensional space such that any subset of the Sobol sequence starting from the beginning will result in a generally evenly distributed set of points. Thus, a multidimensional point set 110 generated according to a Sobol sequence may be used select an evenly distributed set of points 112 for any number of points 112 in the sequence.

Using the indexes 108, for each selected point 112, a mapped sample 104 is selected. In other words, for each point 112, a corresponding sample 104 is selected using the indexes 108. In embodiments where multiple samples 104 are mapped to a given point 112, a sample 104 may be selected for that point 112 from the multiple mapped samples 104 using a variety of approaches as can be appreciated by one skilled in the art (e.g., randomly, first identified or included in the index 108, and the like).

In some embodiments, a point 112 may not have a mapped sample 104 (e.g., an unpopulated point 112). That is, the point 112 is not the closest point 112 for any sample 104. In some embodiments, where a point 112 is unpopulated, no sample 104 is selected for the unpopulated point 112. Thus, a selected sample 104 set may include fewer than a requested number of samples 104. In some embodiments, where a point 112 is unpopulated, a nearest sample 104 to that point 112 may be identified. For example, in some embodiments, one or more nearest populated points 112 (e.g., having some sample 104 mapped to the point) relative to the unpopulated point 112 may be identified. Those samples 104 mapped to the nearest populated points 112 may then be compared to the unpopulated point 112 to find the nearest sample 104. This nearest sample 104 may then be selected for the unpopulated point 112. If the nearest sample 104 is already selected for its mapped point 112, another sample 104 may instead be selected for the unpopulated point 112.

In some embodiments, such as where the data corpus 102 is stored in a Structured Query Language (SQL) database, the samples 104 may be selected using a query directed to the indexes 108 and samples 104. For example, a JOIN operation on a number of unique points 112 in the index 108 and the samples 104 may be used to select a number of requested samples 104. As another example, for a NoSQL database, the index 108 may be sorted and lexicographically searched to identify and select particular samples 104.

In some embodiments, the indexing module 106 may maintain completeness data 114 describing, for each point 112, whether or not a sample 104 has been mapped to that point 112 (e.g., by virtue of that point 112 being closest to the sample 104). As an example, the completeness data 114 may be embodied as a bitmap with each bit corresponding to a particular point 112. Where a sample 104 is mapped to a given point 112, the corresponding bit for that point 112 is set. In embodiments where multiple indexes 108 are used for each permutation of categorical values in the data corpus 102, multiple instances of completeness data 114 may be maintained with each instance of completeness data 114 corresponding to a particular permutation of categorical values.

The completeness data 114 may be used to evaluate a completeness of the data corpus 102. Assuming a substantially even distribution of points 112 in the multidimensional point set 110, the data corpus 102 may be considered complete when each point 112 has been mapped to a sample 104. Accordingly, in some embodiments, a determination or evaluation of completeness may be performed by the indexing module 106 based on the completeness data 114. For example, a report or other indication may be generated describing a degree to which the data corpus 102 is complete based on the completeness data 114. Where multiple instances of completeness data 114 are used for multiple permutations of categorical values, the data corpus 102 may be considered complete when a sample 104 is mapped to each point 112 for each permutation of categorical values.

In some embodiments, the indexing module 106 may detect that a sample 104 has been mapped to a previously unmapped or unpopulated point 112. For example, detecting that a sample 104 has been mapped to a previously unmapped or unpopulated point 112 may include detecting a change to the completeness data 114. As another example, in response to a new index 108 entry for a particular point 112, the index 108 may be searched to determine if another entry for that point 112 exists. Where no entry is found, it may be determined that the particular point 112 was previously unpopulated or unmapped.

In response to detecting that a sample 104 has been mapped to a previously unmapped or unpopulated point 112, the indexing module 106 may cause one or more models to be retrained. For example, the indexing module 106 may provide a signal, command, or notification to a machine learning platform or other application used for training machine learning models and indicate that a model should be retrained in response to the sample 104 being mapped to a previously unmapped point 112. In some embodiments, a set of training data (e.g., a collection of samples 104) may be automatically selected using the indexes 108. The training data may then be used or provided to another entity or service to retrain the model. Thus, as gaps in the completeness of the data corpus 102 are filled, models may be automatically updated to reflect the more complete data corpus 102.

In some embodiments, a request for one or more reduced dimensionality samples 104 may be received. A reduced dimensionality sample 104 is a sample excluding one or more fields of columns of the sample 104 as stored in the data corpus 102. For example, where the data corpus 102 is implemented as a database, a request for one or more reduced dimensionality samples 104 may include a request for samples 104 with a particular subset of columns.

The set of points 112 in the multidimensional space is then mapped to another set of points in a lower dimensional space relative to the multidimensional space. For example, another multidimensional point set 110 may be generated for the lower dimensional space according to similar approaches as are set forth above in generating the initial multidimensional point set 110 (e.g., according to a similar algorithm, sequence, function, and the like). In some embodiments, the multidimensional point set 110 for the lower dimensional space may include a same number of points 112 or fewer points than the multidimensional point set 110 for the higher dimensional space.

In some embodiments, the lower dimensional space may have a dimensionality equal to the dimensionality of the reduced dimensionality samples 104. For example, assuming a request for samples 104 of M dimensions, the lower dimensional space may have M dimensions. In some embodiments, such as where the reduced dimensionality samples 104 include categorical fields, the lower dimensional space may have a dimensionality equal to the number of non-categorical fields in the reduced dimensionality samples 104.

In some embodiments, mapping the set of points 112 in the multidimensional space to another set of points in a lower dimensional space relative to the multidimensional space includes identifying, for each point 112 in the multidimensional space, a nearest point 112 in the lower dimensional space (e.g., based on a Euclidean distance or another function as described above). Accordingly, in some embodiments, each point 112 in the lower dimensional space may be mapped to one or more points 112 in the higher dimensional space.

Using the other set of points 112 (e.g., the points 112 in the lower dimensional space), one or more reduced dimensionality samples 104 are selected from the data corpus. For example, for a given point 112 in the lower dimensionality space, a reduced dimensionality sample 104 may be selected by identifying a mapped point 112 in the higher dimensionality space (e.g., the multidimensional point set 110). Where multiple points 112 in the higher dimensionality space are mapped to the given point 112 in the lower dimensionality space, one of the higher dimensionality points 112 may be selected randomly, based on having a mapped sample 104 (e.g., being populated), or based on other criteria. A sample 104 for the selected higher dimensionality point 112 is then selected as a reduced dimensionality sample 104 by selecting a particular subset of fields for the sample 104.

One skilled in the art will appreciate that the approaches described herein allow for selections of samples 104 based on a substantially even or uniform distribution of points 112 in a multidimensional space. The selected samples 104 thus reflect a substantially even distribution of data, overcoming deficiencies with other approaches for selecting samples 104 where clusters or concentrations of data in the data corpus 102 will be reflected in the selected samples 104.

Indexing a data corpus to a set of multidimensional points in accordance with the present application is generally implemented with computers, that is, with automated computing machinery. For further explanation, therefore, FIG. 3 sets forth a block diagram of computing machinery including an exemplary computer 300 configured for indexing a data corpus to a set of multidimensional points according to certain embodiments. The computer 300 of FIG. 3 includes at least one computer processor 302 or 'CPU' as well as random access memory 304 (RAM') which is connected through a high speed memory bus 306 and bus adapter 308 to processor 302 and to other components of the computer 300.

Stored in RAM 304 is an operating system 310. Operating systems useful in computers configured for indexing a data corpus to a set of multidimensional points according to certain embodiments include UNIX™, Linux™, Microsoft Windows™, and others as will occur to those of skill in the art. The operating system 310 in the example of FIG. 3 is shown in RAM 304, but many components of such software typically are stored in non-volatile memory also, such as, for example, on data storage 312, such as a disk drive.

Figure 3:
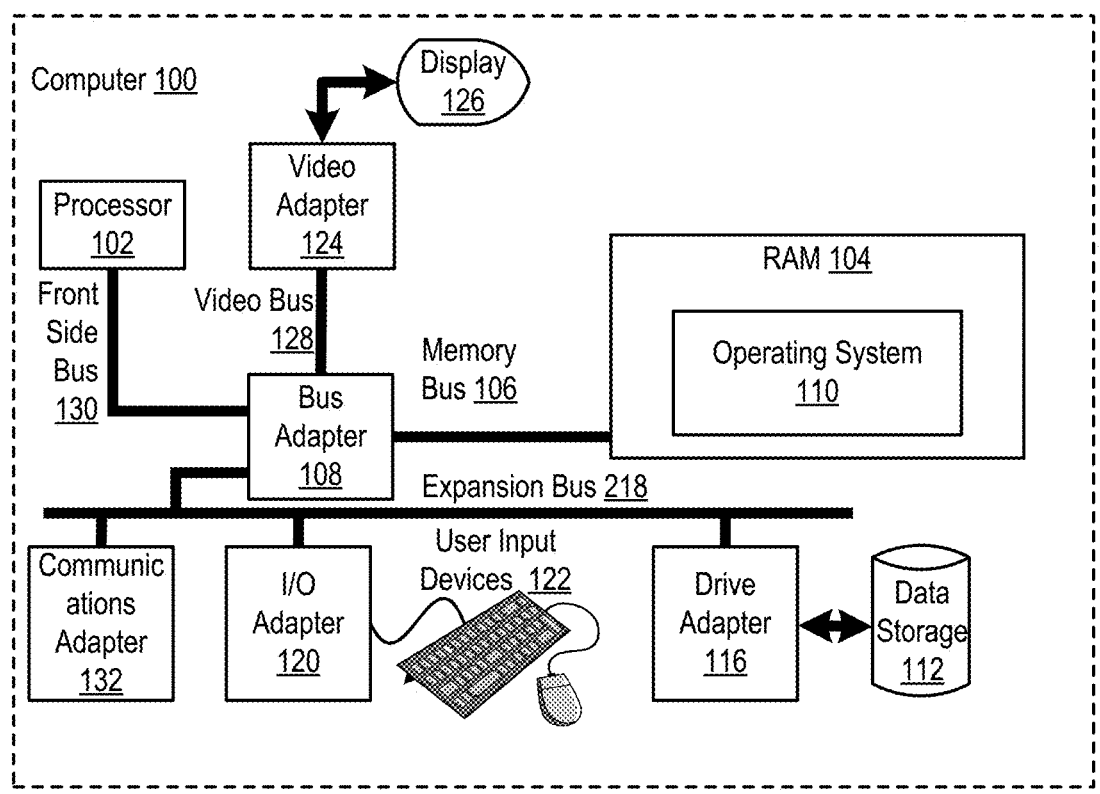
FIG. 3 is a block diagram of an example computing device for indexing a data corpus to a set of multidimensional points according to some embodiments of the present disclosure.

The computer 300 of FIG. 3 includes disk drive adapter 316 coupled through expansion bus 318 and bus adapter 308 to processor 302 and other components of the computer 300. Disk drive adapter 316 connects non-volatile data storage to the computer 300 in the form of data storage 312. Disk drive adapters useful in computers configured for indexing a data corpus to a set of multidimensional points according to certain embodiments include Integrated Drive Electronics ('IDE') adapters, Small Computer System Interface ('SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 300 of FIG. 3 includes one or more input/output ('I/O') adapters 320. I/O adapters implement user-oriented input/output through, for example, software drivers and computer hardware for controlling output to display devices such as computer display screens, as well as user input from user input devices 322 such as keyboards and mice. The example computer 300 of FIG. 3 includes a video adapter 324, which is an example of an I/O adapter specially designed for graphic output to a display device 326 such as a display screen or computer monitor. Video adapter 324 is connected to processor 302 through a high speed video bus 328, bus adapter 308, and the front side bus 330, which is also a high speed bus.

The exemplary computer 300 of FIG. 3 includes a communications adapter 332 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for indexing a data corpus to a set of multidimensional points according to certain embodiments include modems for wired dial-up communications, Ethernet (IEEE 802.3) adapters for wired data communications, and 802.11 adapters for wireless data communications.

Figure 4:
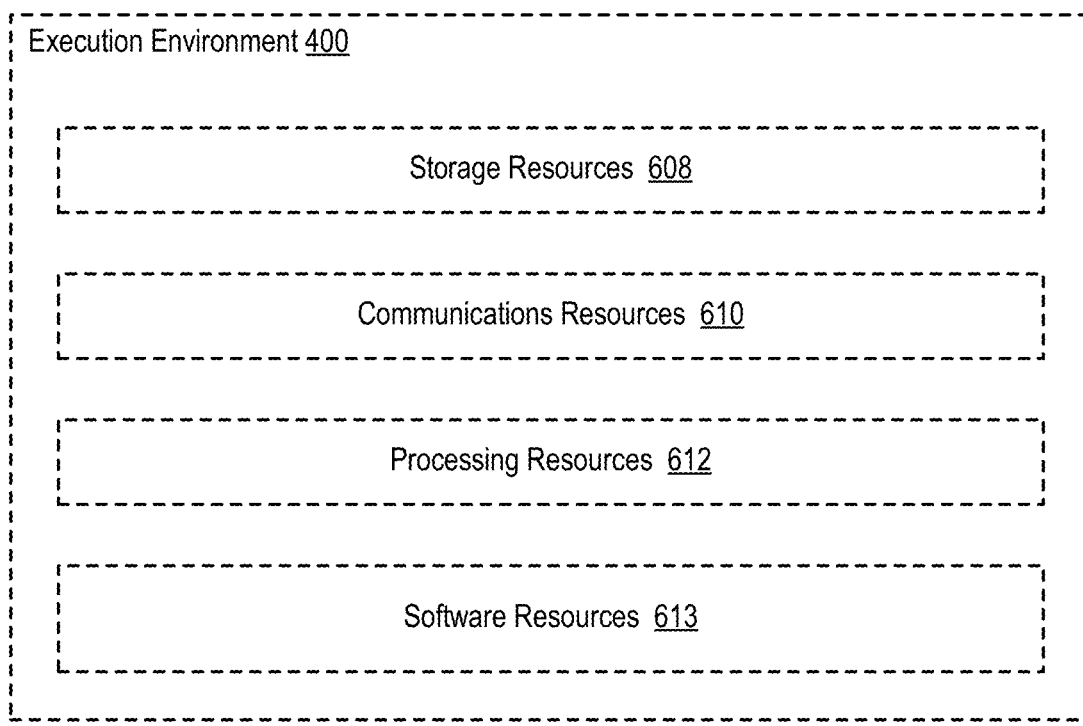
FIG. 4 is a block diagram of an example execution environment for indexing a data corpus to a set of multidimensional points according to some embodiments of the present disclosure.

For further explanation, FIG. 4 sets forth a diagram of an execution environment 400 in accordance with some embodiments of the present disclosure. The execution environment 400 depicted in FIG. 4 may be embodied in a variety of different ways. The execution environment 400 may be provided, for example, by one or more cloud computing providers such as Amazon AWS, Microsoft Azure, Google Cloud, and others, including combinations thereof. Alternatively, the execution environment 400 may be embodied as a collection of devices (e.g., servers, storage devices, networking devices) and software resources that are included in a private data center. In fact, the execution environment 400 may be embodied as a combination of cloud resources and private resources that collectively form a hybrid cloud computing environment. Readers will appreciate that the execution environment 400 may be constructed in a variety of other ways.

The execution environment 400 depicted in FIG. 4 may include storage resources 408, which may be embodied in many forms. For example, the storage resources 408 may include flash memory, hard disk drives, nano-RAM, 3D crosspoint non-volatile memory, MRAM, non-volatile phase-change memory ('PCM'), storage class memory ('SCM'), or many others, including combinations of the storage technologies described above. Readers will appreciate that other forms of computer memories and storage devices may be utilized as part of the execution environment 400, including DRAM, SRAM, EEPROM, universal memory, and many others. The storage resources 408 may also be embodied, in embodiments where the execution environment 400 includes resources offered by a cloud provider, as cloud storage resources such as Amazon Elastic Block Storage ('EBS') block storage, Amazon S3 object storage, Amazon Elastic File System ('EFS') file storage, Azure Blob Storage, and many others. The example execution environment 400 depicted in FIG. 4 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 400 depicted in FIG. 4 also includes communications resources 410 that may be useful in facilitating data communications between components within the execution environment 400, as well as data communications between the execution environment 400 and computing devices that are outside of the execution environment 400. Such communications resources may be embodied, for example, as one or more routers, network switches, communications adapters, and many others, including combinations of such devices. The communications resources 410 may be configured to utilize a variety of different protocols and data communication fabrics to facilitate data communications. For example, the communications resources 410 may utilize Internet Protocol ('IP') based technologies, fibre channel ('FC') technologies, FC over ethernet ('FCoE') technologies, InfiniBand ('IB') technologies, NVM Express ('NVMe') technologies and NVMe over fabrics ('NVMeoF') technologies, and many others. The communications resources 410 may also be embodied, in embodiments where the execution environment 400 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 400, as well as data communications between the execution environment 400 and computing devices that are outside of the execution environment 400.

The execution environment 400 depicted in FIG. 4 also includes processing resources 412 that may be useful in useful in executing computer program instructions and performing other computational tasks within the execution environment 400. The processing resources 412 may include one or more application-specific integrated circuits ('ASICs') that are customized for some particular purpose, one or more central processing units ('CPUs'), one or more digital signal processors ('DSPs'), one or more field-programmable gate arrays ('FPGAs'), one or more systems on a chip ('SoCs'), or other form of processing resources 412. The processing resources 412 may also be embodied, in embodiments where the execution environment 400 includes resources offered by a cloud provider, as cloud computing resources such as one or more Amazon Elastic Compute Cloud ('EC2') instances, event-driven compute resources such as AWS Lambdas, Azure Virtual Machines, or many others.

The execution environment 400 depicted in FIG. 4 also includes software resources 413 that, when executed by processing resources 412 within the execution environment 400, may perform various tasks. The software resources 413 may include, for example, one or more modules of computer program instructions that when executed by processing resources 412 within the execution environment 400 are useful in indexing a data corpus to a set of multidimensional points.

Figure 5:
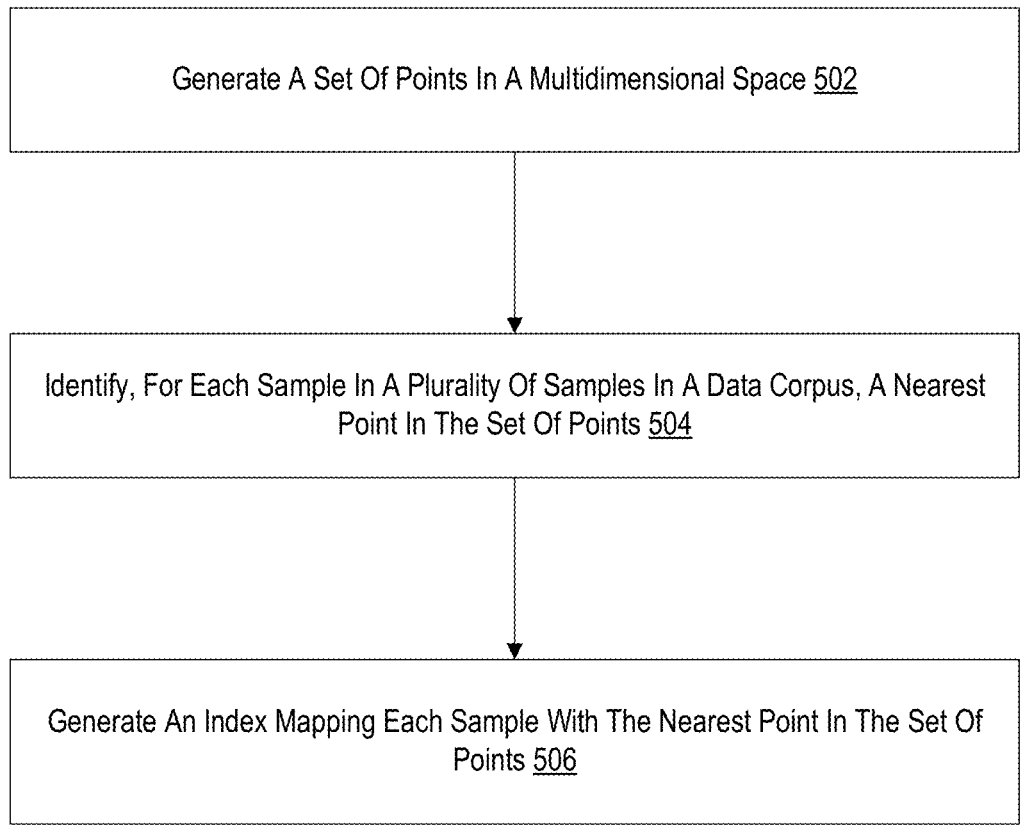
FIG. 5 is a flowchart of an example method for indexing a data corpus to a set of multidimensional points according to some embodiments of the present disclosure.

For further explanation, FIG. 5 sets forth a flowchart of an example method for indexing a data corpus to a set of multidimensional points according to some embodiments of the present disclosure. The method of FIG. 5 may be performed, for example, in a system 100 as shown in FIG. 1, or in a variety of computing devices or execution environments as can be appreciated. The method of FIG. 5 includes generating 502 a set of points 112 in a multidimensional space. Such a set of points 112 may be hereinafter referred to as a multidimensional point set 110. The multidimensional point set 110 includes multiple points 112 of a particular dimensionality. In some embodiments, the dimensionality of the multidimensional point set 110 corresponds to the dimensionality of the samples 104 in the data corpus 102. For example, where each sample 104 includes N fields, the multidimensional point set 110 includes points of N dimensions.

In some embodiments, the dimensionality of the multidimensional point set 110 is of fewer dimensions than the dimensionality of the samples 104 in the data corpus 102. For example, in embodiments where the samples 104 include one or more categorical fields, the dimensionality of the multidimensional point set 110 is equal to the number of non-categorical fields in the samples 104. As described herein, a categorical field is a field whose value is selected from multiple predefined labels or categories (e.g., shirt sizes, a predefined selection of colors, and the like), in contrast to a field whose value is a continuous or other numerical value. In other words, the dimensionality of the multidimensional point set 110 is equal to the dimensionality of the samples 104 minus a number of categorical fields in the samples 104.

The multidimensional point set 110 may be generated according to a variety of algorithms or functions as can be appreciated. For example, in some embodiments, the multidimensional point set 110 may be generated by a manual entry or configuration. As another example, in some embodiments, the multidimensional point set 110 may be generated by iteratively increasing or decreasing particular values in the multidimensional point set 110 to create points 112 each having a particular distance from a previously calculated point 112. In some embodiments, the multidimensional point set 110 may be generated by calculating a sequence of points in multidimensional space. For example, the multidimensional point set 110 may be generated according to a low-discrepancy sequence or a quasi-random low-discrepancy sequence such as a Sobol sequence. In order for the multidimensional point set 110 to provide for an evenly distributed indexing of the data corpus 102, the multidimensional point set 110 should be generated according to some degree of evenness, uniformity, or distribution.

In some embodiments, the number of points 112 in the multidimensional point set 110 is a predefined or default number. In some embodiments, the number of points 112 in the multidimensional point set 110 is based on a user-provided value. In some embodiments, the number of points 112 in the multidimensional point set 110 may correspond to a number of samples 104 to be included in a sample set taken from the data corpus 102. For example, assume that a training data set is to be selected from the data corpus 102 having N samples, the multidimensional point set 110 may be selected as having N points. Accordingly, in some embodiments, the multidimensional point set 110 and the indexes 108 described below may be generated in response to a request or as part of a process for selecting a set of samples 104 from the data corpus 102. One skilled in the art will appreciate that the number of points 112 in the multidimensional point set 110 may vary according to particular design and performance considerations.

The method of FIG. 5 also includes identifying 504, for each sample 104 in a plurality of samples 104 in a data corpus 102, a nearest point 112 in the set of points 112 (e.g., in the multidimensional point set 110). For example, a nearest point 112 may be identified for a given sample 104 based on a Euclidean distance or other distance function as can be appreciated. The method of FIG. 5 also includes generating 506 an index 108 mapping each sample 104 with the nearest point 112 in the set of points 112. In other words, each entry in the index 108 may associate a particular sample 104 with the nearest point 112 for that sample 104. For example, turning to FIG. 2, an index 108 may include a table or other data structure with each entry including a sample identifier 202a,b-n and a correspond point identifier 204a,b-n. In some embodiments, the index 108 may store one or more entries for points 112 to which no sample 104 is mapped. Accordingly, such entries may include null or zero values for the sample identifier 202a,b-n.

Figure 6:
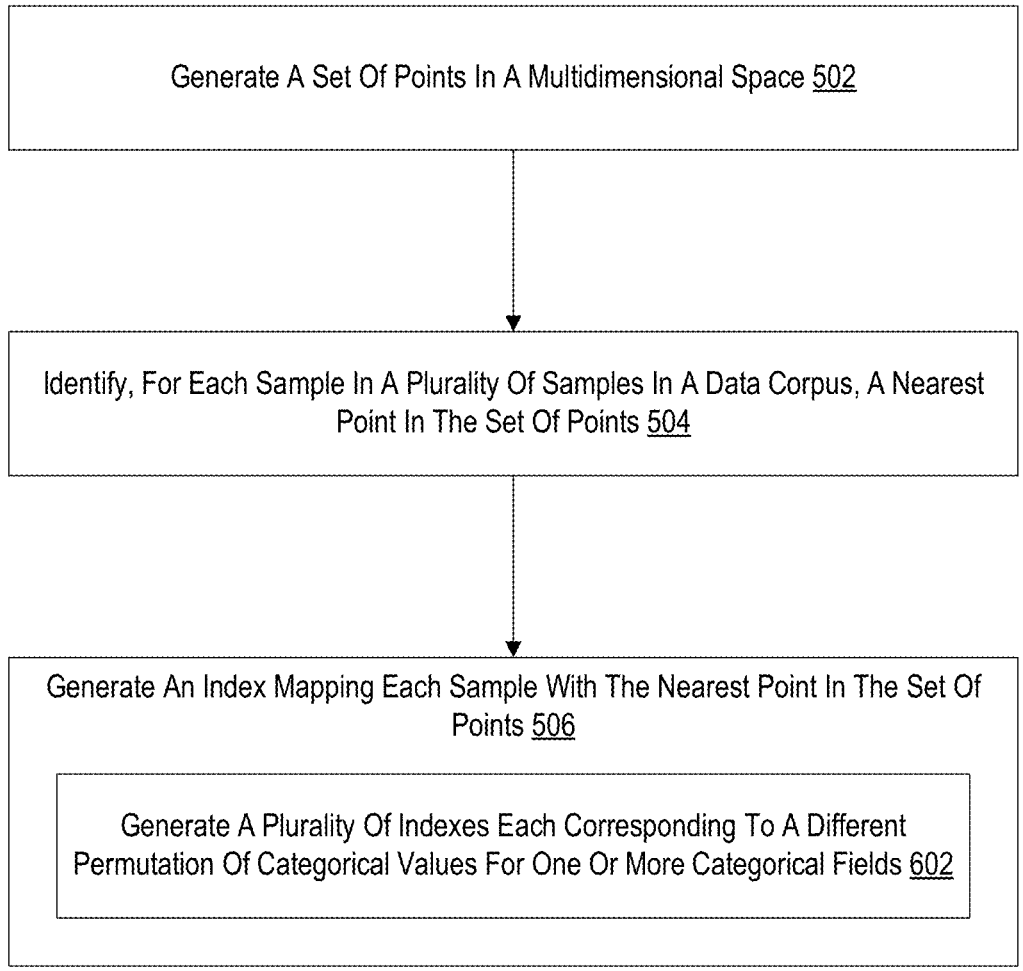
FIG. 6 is a flowchart of another example method for indexing a data corpus to a set of multidimensional points according to some embodiments of the present disclosure.

For further explanation, FIG. 6 sets forth a flowchart of another example method for indexing a data corpus to a set of multidimensional points according to some embodiments of the present disclosure. The method of FIG. 6 is similar to FIG. 5 in that the method of FIG. 6 includes generating 502 a set of points 112 in a multidimensional space; identifying 504, for each sample 104 in a plurality of samples 104 in a data corpus 102, a nearest point 112 in the set of points 112; and generating 506 an index 108 mapping each sample 104 with the nearest point 112 in the set of points 112.

The method of FIG. 6 differs from FIG. 5 in that generating 506 an index 108 mapping each sample 104 with the nearest point 112 in the set of points 112 includes generating 602 a plurality of indexes 108 each corresponding to a different permutation of categorical values for one or more categorical fields. As described herein, a categorical field is a field of a sample 104 whose value is selected from multiple predefined labels or categories (e.g., shirt sizes, a predefined selection of colors, and the like), in contrast to a field whose value is a continuous or other numerical value.

For example, where the samples 104 include a single categorical field of three possible values, three indexes 108 may be generated 602. As another example, where the samples 104 include two categorical fields each of two possible values, four indexes 108 may be generated. To do so, for a given permutation of categorical values, those samples 104 having those categorical values are selected. The nearest point 112 in the multidimensional point set 110 is then identified for the selected samples and an index 108 corresponding to that permutation of categorical values is selected.

Figure 7:
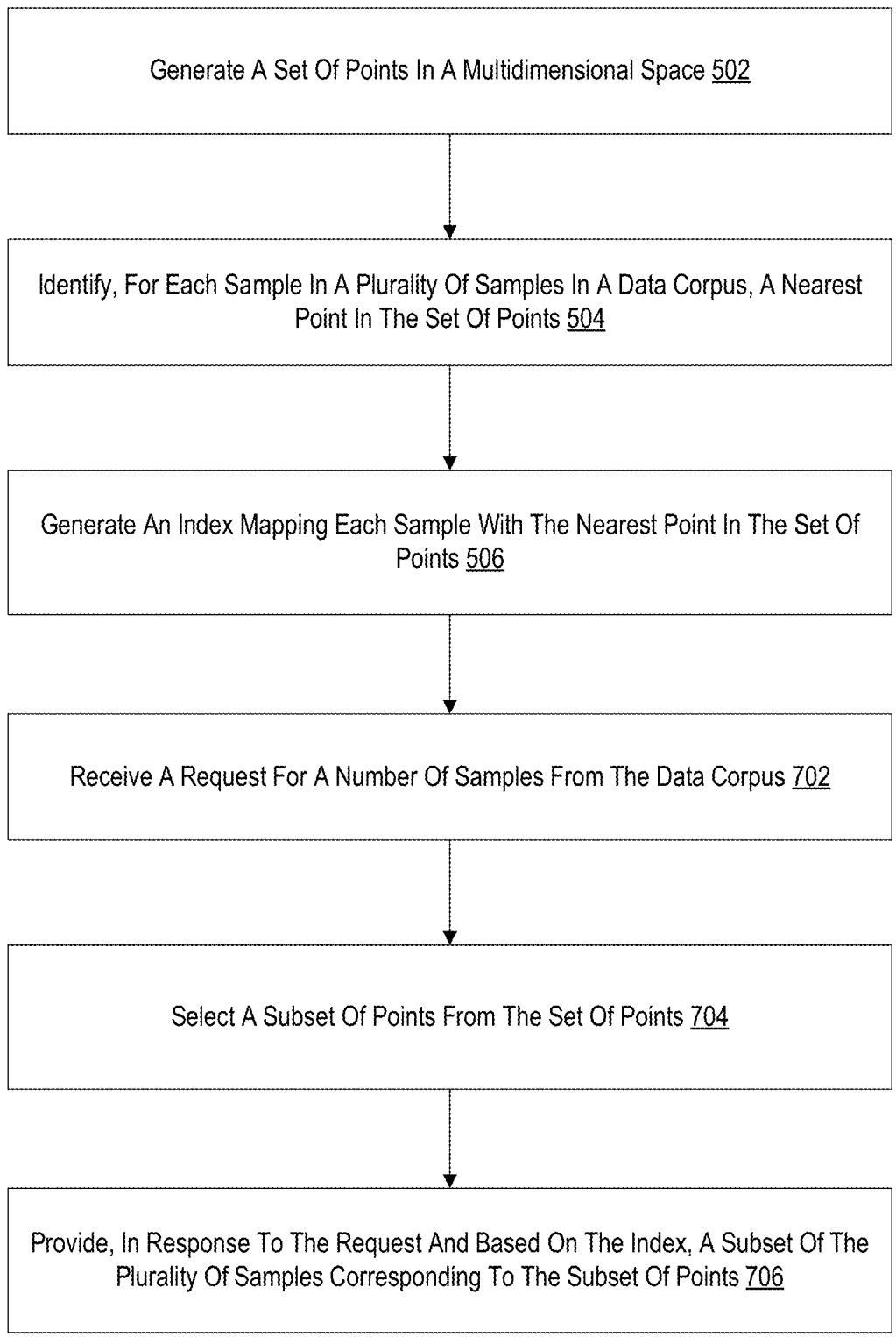
FIG. 7 is a flowchart of another example method for indexing a data corpus to a set of multidimensional points according to some embodiments of the present disclosure.

For further explanation, FIG. 7 sets forth a flowchart of another example method for indexing a data corpus to a set of multidimensional points according to some embodiments of the present disclosure. The method of FIG. 7 is similar to FIG. 5 in that the method of FIG. 7 includes generating 502 a set of points 112 in a multidimensional space; identifying 504, for each sample 104 in a plurality of samples 104 in a data corpus 102, a nearest point 112 in the set of points 112; and generating 506 an index 108 mapping each sample 104 with the nearest point 112 in the set of points 112.

The method of FIG. 7 differs from FIG. 5 in that the method of FIG. 7 includes receiving 702 a request for a number of samples 104 from the data corpus 102. For example, assume that a request for N samples 104 from the data corpus 102 is received in order to generate a set of training data having N samples 104. The method of FIG. 7 also includes selecting 704 a subset of points 112 from the set of points 112. For example, in some embodiments, a number of points 112 equal to the number of requested samples 104 are selected. In some embodiments, the number of points 112 may be selected as a range or sequence of points. For example, where the multidimensional point set 110 is generated according to a Sobol sequence, the points 112 may be selected as the first N points 112 in the Sobol sequence. A particular advantage of the Sobol sequence is that, as points 112 are added to the sequence, each point 112 is added to fill gaps in the multidimensional space such that any subset of the Sobol sequence starting from the beginning will result in a generally evenly distributed set of points. Thus, a multidimensional point set 110 generated according to a Sobol sequence may be used select an evenly distributed set of points 112 for any number of points 112 in the sequence.

The method of FIG. 7 also includes providing 706, in response to the request and based on the index 108, a subset of the plurality of samples 104 corresponding to the subset of points 112. In other words, for each point 112, a corresponding sample 104 is selected using the indexes 108. In embodiments where multiple samples 104 are mapped to a given point 112, a sample 104 may be selected for that point 112 from the multiple mapped samples 104 using a variety of approaches as can be appreciated by one skilled in the art (e.g., randomly, first identified or included in the index 108, and the like).

In some embodiments, a point 112 may not have a mapped sample 104 (e.g., an unpopulated point 112). That is, the point 112 is not the closest point 112 for any sample 104. In some embodiments, where a point 112 is unpopulated, no sample 104 is selected for the unpopulated point 112. Thus, a selected sample 104 set may include fewer than a requested number of samples 104. In some embodiments, where a point 112 is unpopulated, a nearest sample 104 to that point 112 may be identified. For example, in some embodiments, one or more nearest populated points 112 (e.g., having some sample 104 mapped to the point) relative to the unpopulated point 112 may be identified. Those samples 104 mapped to the nearest populated points 112 may then be compared to the unpopulated point 112 to find the nearest sample 104. This nearest sample 104 may then be selected for the unpopulated point 112. If the nearest sample 104 is already selected for its mapped point 112, another sample 104 may instead be selected for the unpopulated point 112.

Figure 8:
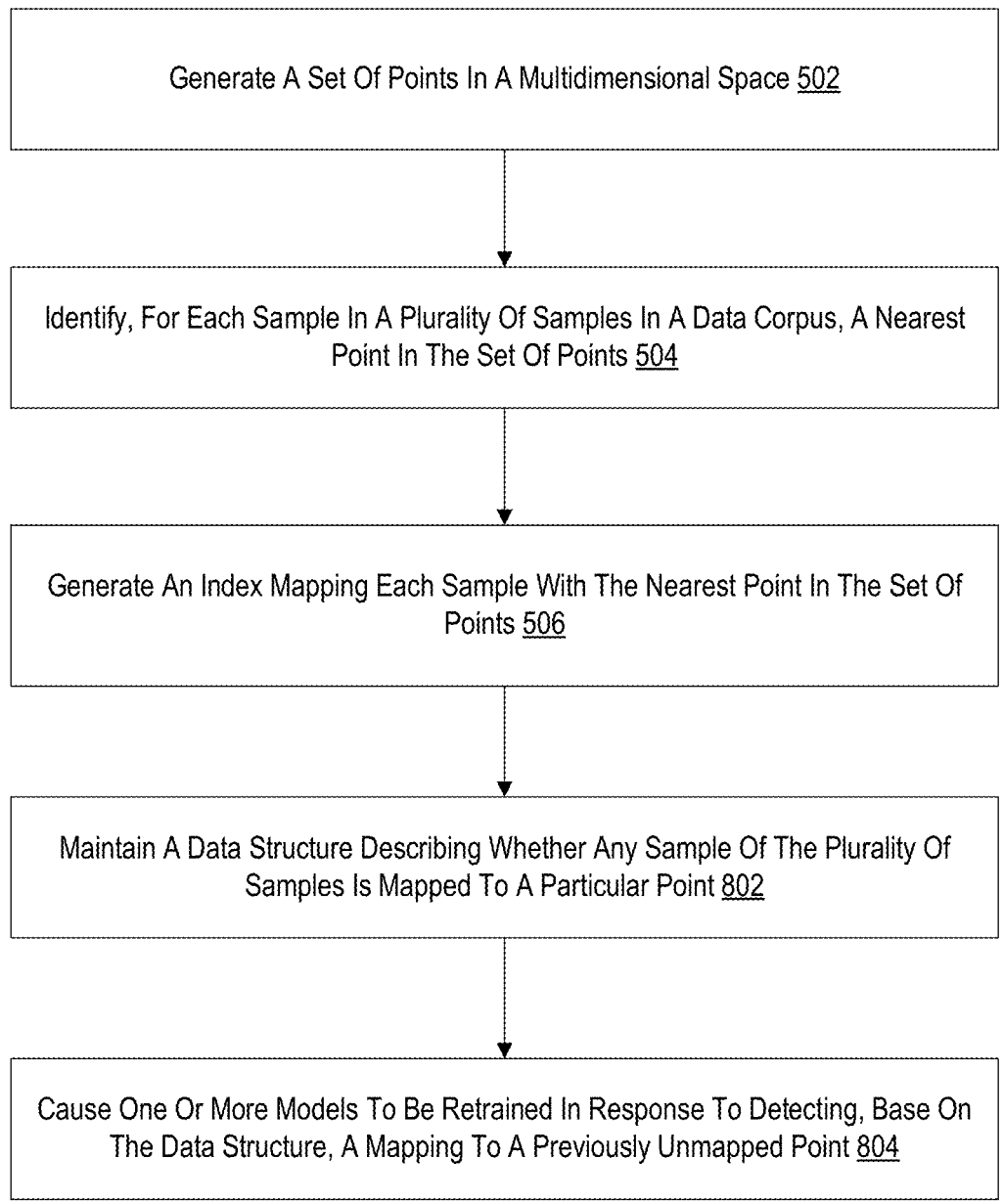
FIG. 8 is a flowchart of another example method for indexing a data corpus to a set of multidimensional points according to some embodiments of the present disclosure.

For further explanation, FIG. 8 sets forth a flowchart of another example method for indexing a data corpus to a set of multidimensional points according to some embodiments of the present disclosure. The method of FIG. 8 is similar to FIG. 5 in that the method of FIG. 8 includes generating 502 a set of points 112 in a multidimensional space; identifying 504, for each sample 104 in a plurality of samples 104 in a data corpus 102, a nearest point 112 in the set of points 112; and generating 506 an index 108 mapping each sample 104 with the nearest point 112 in the set of points 112.

The method of FIG. 8 differs from FIG. 5 in that the method of FIG. 8 includes maintaining 802 a data structure describing whether any sample 104 of the plurality of samples 112 is mapped to a particular point 112. For example, in some embodiments, the indexing module 106 may maintain completeness data 114 describing, for each point 112, whether or not a sample 104 has been mapped to that point 112 (e.g., by virtue of that point 112 being closest to the sample 104). As an example, the completeness data 114 may be embodied as a bitmap with each bit corresponding to a particular point 112. Where a sample 104 is mapped to a given point 112, the corresponding bit for that point 112 is set. In embodiments where multiple indexes 108 are used for each permutation of categorical values in the data corpus 102, multiple instances of completeness data 114 may be maintained with each instance of completeness data 114 corresponding to a particular permutation of categorical values.

The completeness data 114 may be used to evaluate a completeness of the data corpus 102. Assuming a substantially even distribution of points 112 in the multidimensional point set 110, the data corpus 102 may be considered complete when each point 112 has been mapped to a sample 104. Accordingly, in some embodiments, a determination or evaluation of completeness may be performed by the indexing module 106 based on the completeness data 114. For example, a report or other indication may be generated describing a degree to which the data corpus 102 is complete based on the completeness data 114. Where multiple instances of completeness data 114 are used for multiple permutations of categorical values, the data corpus 102 may be considered complete when a sample 104 is mapped to each point 112 for each permutation of categorical values.

The method of FIG. 8 also includes causing 804 one or more models to be retrained in response to detecting, based on the data structure (e.g., the completeness data 114), a mapping to a previously unmapped point 112. For example, a signal, command, or notification may be provided to a machine learning platform or other application used for training machine learning models and indicate that a model should be retrained in response to the sample 104 being mapped to a previously unmapped point 112. In some embodiments, a set of training data (e.g., a collection of samples 104) may be automatically selected using the indexes 108. The training data may then be used or provided to another entity or service to retrain the model. Thus, as gaps in the completeness of the data corpus 102 are filled, models may be automatically updated to reflect the more complete data corpus 102.

Figure 9:
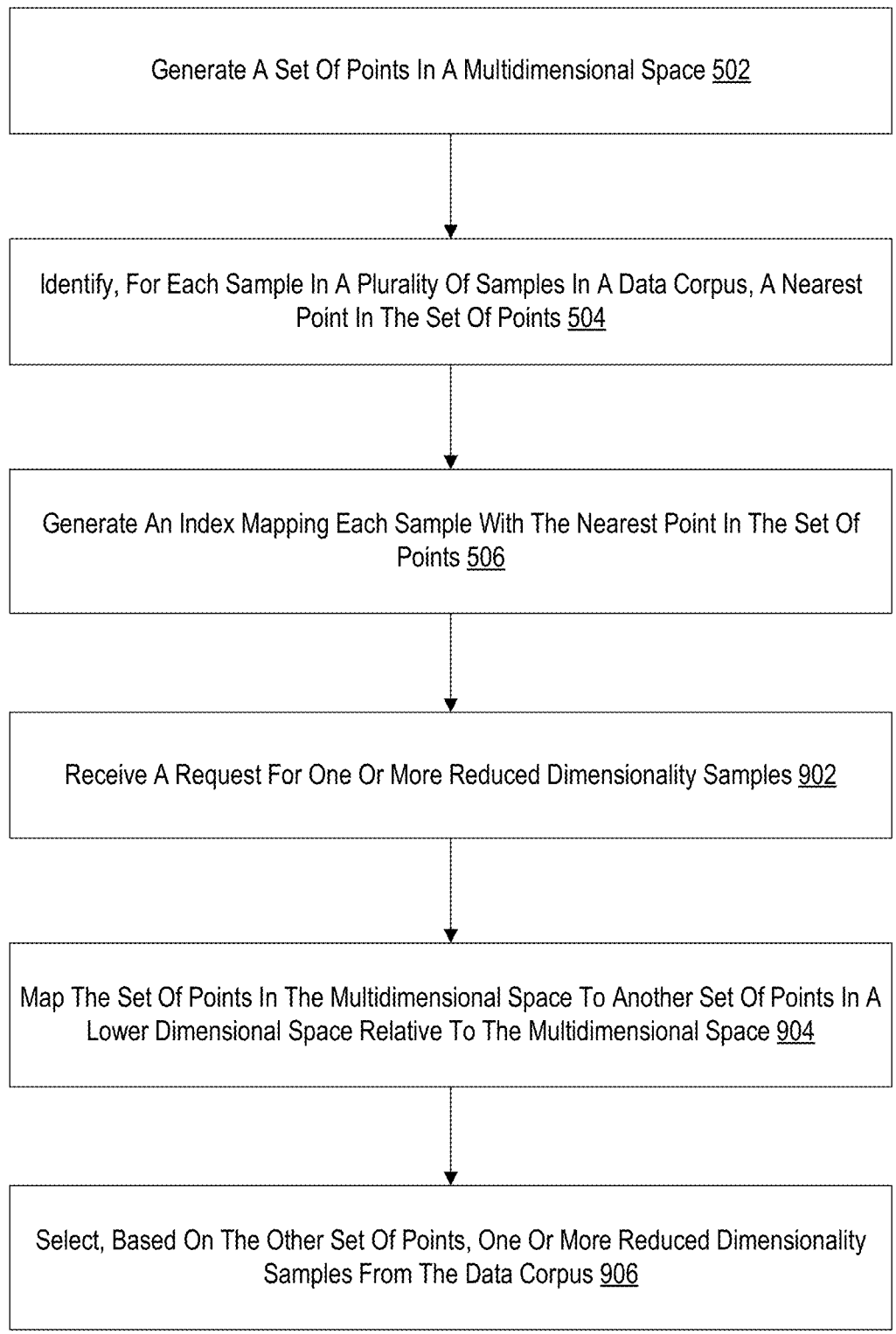
FIG. 9 is a flowchart of another example method for indexing a data corpus to a set of multidimensional points according to some embodiments of the present disclosure.

For further explanation, FIG. 9 sets forth a flowchart of another example method for indexing a data corpus to a set of multidimensional points according to some embodiments of the present disclosure. The method of FIG. 9 is similar to FIG. 5 in that the method of FIG. 9 includes generating 502 a set of points 112 in a multidimensional space; identifying 504, for each sample 104 in a plurality of samples 104 in a data corpus 102, a nearest point 112 in the set of points 112; and generating 506 an index 108 mapping each sample 104 with the nearest point 112 in the set of points 112.

The method of FIG. 9 differs from FIG. 5 in that the method of FIG. 9 includes receiving 902 a request for one or more reduced dimensionality samples 104. A reduced dimensionality sample 104 is a sample excluding one or more fields or columns of the sample 104 as stored in the data corpus 102. For example, where the data corpus 102 is implemented as a database, a request for one or more reduced dimensionality samples 104 may include a request for samples 104 with a particular subset of columns.

The method of FIG. 9 also includes mapping the set of points 112 in the multidimensional space to another set of points in a lower dimensional space relative to the multidimensional space. For example, another multidimensional point set 110 may be generated for the lower dimensional space according to similar approaches as are set forth above in generating the initial multidimensional point set 110 (e.g., according to a similar algorithm, sequence, function, and the like). In some embodiments, the multidimensional point set 110 for the lower dimensional space may include a same number of points 112 or fewer points than the multidimensional point set 110 for the higher dimensional space.

In some embodiments, the lower dimensional space may have a dimensionality equal to the dimensionality of the reduced dimensionality samples 104. For example, assuming a request for samples 104 of M dimensions, the lower dimensional space may have M dimensions. In some embodiments, such as where the reduced dimensionality samples 104 include categorical fields, the lower dimensional space may have a dimensionality equal to the number of non-categorical fields in the reduced dimensionality samples 104.

In some embodiments, mapping the set of points 112 in the multidimensional space to another set of points in a lower dimensional space relative to the multidimensional space includes identifying, for each point 112 in the multidimensional space, a nearest point 112 in the lower dimensional space (e.g., based on a Euclidean distance or another function as described above). Accordingly, in some embodiments, each point 112 in the lower dimensional space may be mapped to one or more points 112 in the higher dimensional space.

The method of FIG. 9 also includes selecting 906, based on the other set of points 112 (e.g., the points 112 in the lower dimensional space), one or more reduced dimensionality samples 104 from the data corpus. For example, for a given point 112 in the lower dimensionality space, a reduced dimensionality sample 104 may be selected by identifying a mapped point 112 in the higher dimensionality space (e.g., the multidimensional point set 110). Where multiple points 112 in the higher dimensionality space are mapped to the given point 112 in the lower dimensionality space, one of the higher dimensionality points 112 may be selected randomly, based on having a mapped sample 104 (e.g., being populated), or based on other criteria. A sample 104 for the selected higher dimensionality point 112 is then selected as a reduced dimensionality sample 104 by selecting a particular subset of fields for the sample 104.

In view of the explanations set forth above, readers will recognize that the benefits of indexing a data corpus to a set of multidimensional points include:

Improved performance of a computing system by providing for selection of an evenly distributed sample set from a data corpus.

Improved performance of a computing system by monitoring the completeness of a data corpus.

Improved performance of a computing system by automatically retraining models as gaps in data corpus completeness are filled.

Exemplary embodiments of the present disclosure are described largely in the context of a fully functional computer system for indexing a data corpus to a set of multidimensional points. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of indexing a data corpus to a set of multidimensional points, the method comprising:
    generating a set of points comprising a Sobol sequence in a multidimensional space;
    identifying, for each sample in a plurality of samples in a data corpus, a nearest point in the set of points;
    generating an index mapping each sample with the nearest point in the Sobol sequence;
    receiving a request for a number of samples from the data corpus;
    selecting a subset of points from the Sobol sequence, wherein the subset of points includes a number of points equal to the number of samples, and wherein the subset of points are sequential from a beginning of the Sobol sequence;
    providing, in response to the request and based on mappings in the index to the subset of points, a subset of the plurality of samples corresponding to the subset of points; and
    generating one or more models by training the one or more models using the subset of the plurality of samples.

2. The method of claim 1, wherein identifying the nearest point is based on a Euclidean distance.

3. The method of claim 1, wherein the data corpus comprises one or more categorical fields, and wherein generating the index comprises generating a plurality of indexes each corresponding to a different permutation of categorical values for the one or more categorical fields.

4. The method of claim 1, further comprising maintaining a data structure describing, for each point in the plurality of points, whether any sample of the plurality of samples is mapped to a particular point.

5. The method of claim 4, wherein the data structure is one of a plurality of data structures each corresponding to a different permutation of categorical values for one or more categorical fields of the data corpus.

6. The method of claim 4, further comprising causing one or models to be retrained in response to detecting, based on the data structure, a mapping to a previously unmapped point in the set of points.

7. The method of claim 1, further comprising:
    receiving a request for one or more reduced dimensionality samples;
    mapping the set of points in the multidimensional space to another set of points in a lower dimensional space relative to the multidimensional space; and selecting, based on the other set of points, the one or more samples from the data corpus.

8. A system for indexing a data corpus to a set of multidimensional points, the system configured to perform steps comprising:
  generating a set of points comprising a Sobol sequence in a multidimensional space;
  identifying, for each sample in a plurality of samples in a data corpus, a nearest point in the set of points;
  generating an index mapping each sample with the nearest point in the Sobol sequence;
  receiving a request for a number of samples from the data corpus;
  selecting a subset of points from the Sobol sequence, wherein the subset of points includes a number of points equal to the number of samples, and wherein the subset of points are sequential from a beginning of the Sobol sequence;
  providing, in response to the request and based on mappings in the index to the subset of points, a subset of the plurality of samples corresponding to the subset of points; and
  generating one or more models by training the one or more models using the subset of the plurality of samples.

9. The system of claim 8, wherein identifying the nearest point is based on a Euclidean distance.

10. The system of claim 8, wherein the data corpus comprises one or more categorical fields, and wherein generating the index comprises generating a plurality of indexes each corresponding to a different permutation of categorical values for the one or more categorical fields.

11. The system of claim 8, wherein the steps further comprise maintaining a data structure describing, for each point in the plurality of points, whether any sample of the plurality of samples is mapped to a particular point.

12. The system of claim 11, wherein the data structure is one of a plurality of data structures each corresponding to a different permutation of categorical values for one or more categorical fields of the data corpus.

13. The system of claim 11, wherein the steps further comprise causing one or models to be retrained in response to detecting, based on the data structure, a mapping to a previously unmapped point in the set of points.

14. The system of claim 8, wherein the steps further comprise:
  receiving a request for one or more reduced dimensionality samples;
  mapping the set of points in the multidimensional space to another set of points in a lower dimensional space relative to the multidimensional space; and
  selecting, based on the other set of points, the one or more samples from the data corpus.

15. A computer program product comprising a non-transitory computer readable medium storing computer program instructions for indexing a data corpus to a set of multidimensional points that, when executed, cause a computer system to perform steps comprising:
  generating a set of points comprising a Sobol sequence in a multidimensional space;
  generating an index mapping each sample with the nearest point in the Sobol sequence;
  generating an index mapping each sample with the nearest point in the set of points;
  receiving a request for a number of samples from the data corpus;
  selecting a subset of points from the Sobol sequence, wherein the subset of points includes a number of points equal to the number of samples, and wherein the subset of points are sequential from a beginning of the Sobol sequence;
  providing, in response to the request and based on mappings in the index to the subset of points, a subset of the plurality of samples corresponding to the subset of points; and
  generating one or more models by training the one or more models using the subset of the plurality of samples.

16. The computer program product of claim 15, wherein identifying the nearest point is based on a Euclidean distance.

17. The computer program product of claim 15, wherein the data corpus comprises one or more categorical fields, and wherein generating the index comprises generating a plurality of indexes each corresponding to a different permutation of categorical values for the one or more categorical fields.

18. The computer program product of claim 15, wherein the steps further comprise maintaining a data structure describing, for each point in the plurality of points, whether any sample of the plurality of samples is mapped to a particular point.

19. The computer program product of claim 18, wherein the data structure is one of a plurality of data structures each corresponding to a different permutation of categorical values for one or more categorical fields of the data corpus.

20. The computer program product of claim 15, wherein the steps further comprise causing one or models to be retrained in response to detecting, based on the data structure, a mapping to a previously unmapped point in the set of points.

* * * * *